United States Patent [19]

Moody et al.

[11] E Re. 29,020

[45] Reissued Nov. 2, 1976

[54] DRILLING APPARATUS

[75] Inventors: David L. Moody, Onconta; James B. Loftis, Remlap, both of Ala.

[73] Assignee: Joy Manufacturing Company, Pittsburgh, Pa.

[22] Filed: Dec. 20, 1974

[21] Appl. No.: 534,664

Related U.S. Patent Documents

Reissue of:

[64] Patent No.: 3,835,938
Issued: Sept. 17, 1974
Appl. No.: 361,019
Filed: May 17, 1973

[52] U.S. Cl. ..... 175/52; 175/62; 175/85; 214/2.5; 211/60 S

[51] Int. Cl.[2] ..... E21B 19/14

[58] Field of Search ..... 175/52, 85, 62; 254/2.5; 211/60 S

[56] References Cited

UNITED STATES PATENTS

| | | | |
|---|---|---|---|
| 3,089,549 | 5/1963 | Robbins | 175/85 |
| 3,158,211 | 11/1964 | McCue et al. | 175/85 |
| 3,194,313 | 7/1965 | Fanshawe | 175/85 X |
| 3,294,185 | 12/1966 | O'Neill et al. | 175/85 |
| 3,395,940 | 8/1968 | Young et al. | 175/52 X |
| 3,411,596 | 11/1968 | Robbins | 175/85 |
| 3,741,322 | 6/1973 | Wolters | 175/52 |

*Primary Examiner*—Ernest R. Purser
*Assistant Examiner*—Richard E. Favreau

[57] ABSTRACT

[A carriage movable by a power unit along a track carrying a drive shaft connected sequentially to a plurality of drill rods. The drill rods are supplied by spaced apart transversely movable rack assemblies having upwardly opening spaced recesses therein. Transverse, spaced apart support arms are mounted for pivotal movement in vertical planes about a common axis selectively to an upper position in alignment with the drive shaft and to a lower position beneath the drill rods carried by the rack assembly. The rack assemblies are moved to position drill rods sequentially in alignment with the path of movement of the support arms.]

*A drilling apparatus and more particularly a drilling apparatus adapted for drilling holes into the side of a mass of earth and including thereon improved drill rod carrying and transfer means.*

15 Claims, 5 Drawing Figures

DRILLING APPARATUS

Matter enclosed in heavy brackets [ ] appears in the original patent but forms no part of this reissue specification; matter printed in italics indicates the additions made by reissue.

BACKGROUND OF THE INVENTION

This invention relates to drilling apparatus and more particularly to apparatus for drilling holes into the side of a mass of earth.

Heretofore in the art to which our invention relates, difficulties have been encountered in supplying drill rod sections to the drilling apparatus whereby the apparatus may operate in a substantially continuous manner. That is, individual arms have been provided for supplying single drill rod sections at a time whereby a second drill rod section may be inserted into the apparatus after the first drill rod section has moved into the mass of earth. In view of the size, weight and length of hollow drill rod sections, it is very difficult to supply a plurality of hollow drill rod sections. This is especially true when drill rod sections are supplied after the drill is in operation.

BRIEF SUMMARY OF THE INVENTION

In accordance with our present invention, we provide spaced apart rack assemblies having upwardly opening spaced apart recesses therein for supporting a plurality of drill rod sections at an elevation below and in parallel relation to the drive shaft for the drilling apparatus. The rack assemblies are moved transversely of the frame concomitantly to position drill rod sections sequentially in alignment with the path of movement of spaced apart support arms. The support arms extend transversely of the drill rod sections carried by the rack assemblies and are adapted for pivotal movement whereby the drill rod sections are transferred sequentially from the rack assembly to a position in alignment with the drill shaft for the drilling apparatus. Means is provided for indicating relative positions of the support arms and the rack assemblies whereby a drill rod section is in proper position to be transferred by the support arms each time the support arms are moved upwardly.

DESCRIPTION OF THE DRAWINGS

Apparatus embodying features of our invention is illustrated in the accompanying drawings, forming a part of this application, in which.

Figure 1:
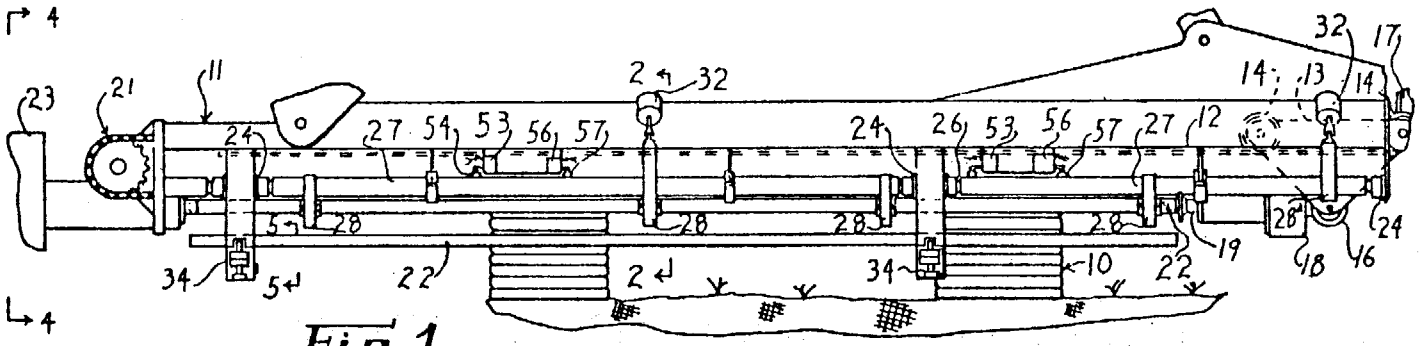
FIG. 1 is a side elevational view, partly broken away.

Referring now to the drawings for a better understanding of our invention, we show a mobile support unit 10 for supporting a translatable frame 11 which extends in a generally horizontal plane, as shown in FIG. 1. Extending longitudinally of the frame 11 is an elongated trackway 12 for supporting a movable carriage 13 having upper flanged rollers 14 which ride along the upper surface of the trackway 12. The carriage 13 also carries a lower flanged roller 16 which engages the under surface of a longitudinally extending rail to limit upward movement of the carriage as it moves longitudinally along the trackway 12.

Mounted on the carriage 13 is an electric motor 17 which is operatively connected to a transmission 18 for rotating a hollow driving head or shaft 19. The motor 17, transmission 18 and drive shaft 19 are all adapted for longitudinally movement with the carriage along the trackway 12. The movable carriage 13 is operatively connected to a sprocket and chain assembly indicated generally at 21 whereby upon movement of the sprocket and chain assembly in opposite directions, the carriage 13 is moved in opposite directions along the guideway 12. The sprocket and chain assembly 21 may be of the type shown and described in the Davis Robbins U.S. Pat. No. 3,089,549 dated May 14, 1963 and entitled "Drilling Apparatus." Since the apparatus for moving carriage 13 along the trackway 12 is conventional type apparatus well knwon in the art to which our invention relates, no further description thereof is deemed necessary.

The hollow drive shaft 19 is provided with a threaded male coupling which is adapted to engage the threaded female coupling of a hollow drill rod section 22 for conveying air therethrough to clear the hole being drilled of cuttings. A conventional type drill bit is carried by the forward end of the first drill rod section 22 which is attached to the hollow drive shaft 19 and air under pressure is supplied to the hollow drive shaft 19 from a suitable source of supply. The forward end of the frame 11 carries a downwardly opening discharge housing 23 which is adapted to encase the drill rod section adjacent the side of a mass of earth into which a hole is to be bored.

Figure 4:
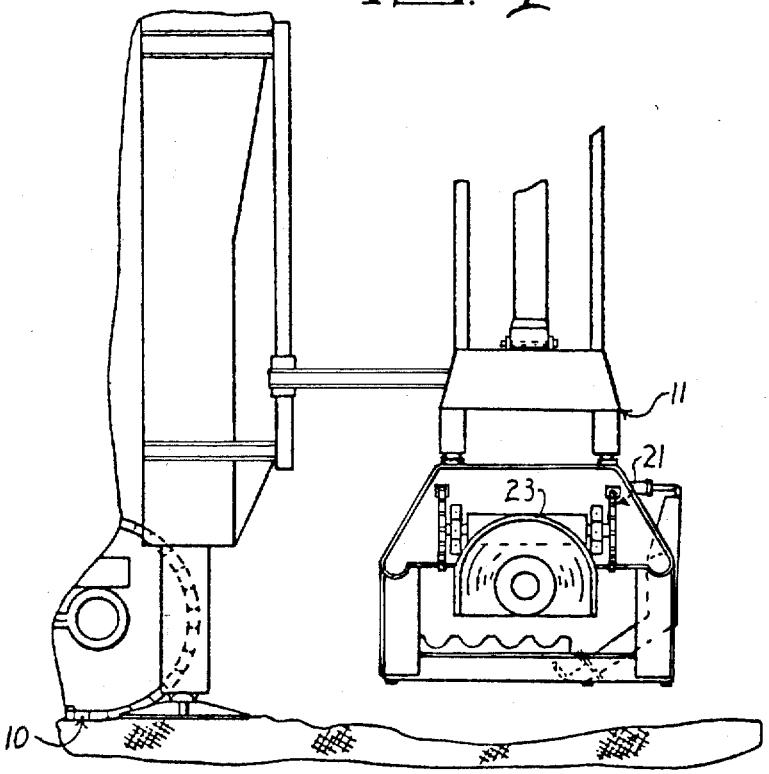
FIG. 4 is an enlarged, fragmental view taken generally along the line 4—4 of FIG. 1; and, FIG. 5 is an enlarged, fragmental view taken generally along the line 5—5 of FIG. 1, partly broken away showing the means for moving the rack transversely of the apparatus and showing the opposite side of the rack assembly from that shown in FIG. 4.

While we have shown in FIG. 4 only one elongated frame 11 carried by the mobile unit 10, we preferably mount an elongated frame 11 at each side of the mobile unit 10. Accordingly, movable carriages 13 would be adapted for movement along opposite sides of the mobile unit 10 with the carriages moving generally parallel to each other whereby generally parallel holes are drilled into the side of the earth being bored.

Figure 2:
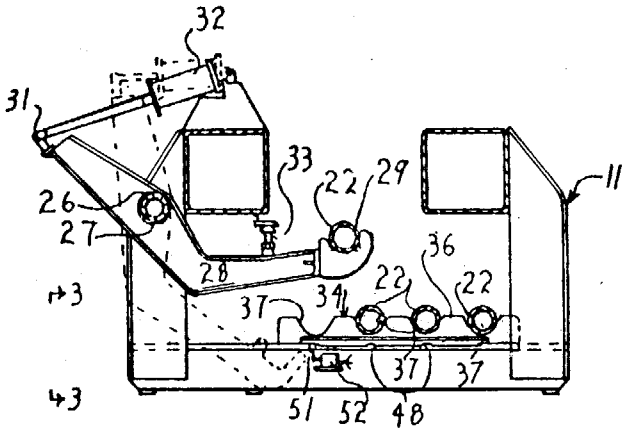
FIG. 2 is an enlarged, sectional view taken generally along the line 2—2 of FIG. 1.

Mounted for rotation in suitable bearings 24 at one side of the frame 11 is an elongated member 26 which extends substantially the entire length of the frame 11. Elongated tubular members 27 are secured to the elongated member 26, as shown in FIG. 1, to add strength thereto. Transversely extending support arms 28 are mounted on the elongated tubular members 27 and rotate therewith whereby they are adapted for pivotal movement in generally vertical planes about a common axis. An upwardly opening recess *or drill steel support portion* 29 is provided in the inner surface of each support arm 28 for receiving a drill rod section 22, as shown in FIG. 2. One of the support arms 28 and an arm 28a, which is also secured to the tubular member 27, projects upwardly above the connections to the elongated tubular member 27 and the upper end of each is pivotally connected by a suitable pivot pin 31 to a fluid pressure operated cylinder 32 whereby the support arms are rotated as rotary motion is imparted to the elongated tubular member 27.

As shown in FIG. 2, upward movement of the inner end of each support arm 28 is limited by an adjustable stop member 33 carried by the support arm 28 in position to engage a stationary part of the frame 11. Accordingly, upon movement of the inner end of each support arm 28 to its uppermost position, the drill rod section 22 is moved to a position in alignment with the drive shaft 19 whereby it may be connected to the drive shaft in the usual manner. Accordingly, the upwardly opening recess 29 for receiving the drill rod section 29 is movable selectively to a lower position at an elevation below a drill rod section to be transferred and to an upper position in alignment with the drive shaft 19.

Figure 3:
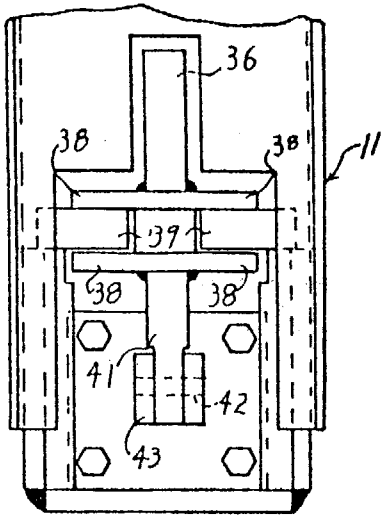
FIG. 3 is an enlarged, fragmental view taken generally along the line 3—3 of FIG. 2.

The drill rod sections 22 to be transferred sequentially to a position in alignment with the drive shaft 19 are supported by spaced apart rack assemblies 34. Each rack assembly 34 comprises an elongated movable member 36 having upwardly opening recesses 37 therein for receiving the drill rod sections 22. The upwardly opening recesses 37 are spaced from each other, as shown, to support the drill rod sections 22 in parallel relation to each other. Laterally projecting guide members 38 are carried by the lower portion of the movable member 36 in vertically spaced relation to each other for slidably receiving horizontal guide members 39 carried by a stationary part of the frame 11, as shown in FIG. 3. Accordingly, the elongated movable member 36 carrying the upwardly opening recesses 37 is adapted for sliding movement along the inwardly projecting guide members 39 carried by the frame 11.

Figure 5:
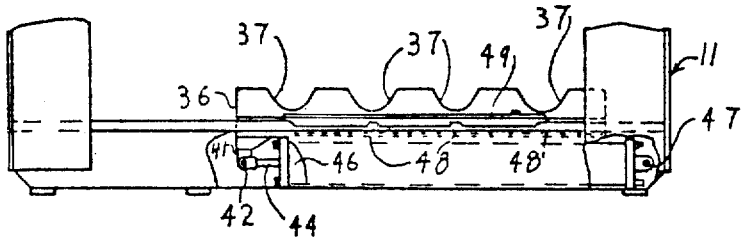

Secured to and projecting downwardly from one end of the elongated movable member 36 is a bracket 41 which is pivotally connected by a pivot pin 42 to a clevis member 43 carried by a piston rod 44 of a fluid pressure operated cylinder 46, as shown in FIG. 5. The opposite end of the cylinder 46 is pivotally connected by a pivot pin 47 to a stationary part of the frame 11, as shown.

Downwardly opening recesses 48 are provided in an elongated member 49 carried by the elongated movable member 36, as shown in FIGS. 2 and 5. The recesses 48 are spaced from each other a distance equal the distance between the upwardly opening recesses 37 in position to engage a movable element 51 of a micro switch 52 which controls movement of the elongated member 36 by the fluid pressure operated cylinder 46. That is, the micro switch 52 is operatively connected to the fluid pressure operated cylinder 46 whereby it interrupts movement of the piston rod 44 at predetermined locations to position the drill rod sections 22 sequentially in alignment with the path of movement of the support arms 28.

While we have shown only two of the support arms 28 as being operatively connected to the fluid pressure operated cylinders 32, the other support arms 28 are secured rigidly to the elongated tubular member 27 whereby they are rotated with the tubular member 27 in response to actuation of the fluid pressure operated cylinders 32. As shown in FIG. 1, the rack assemblies 34 are spaced longitudinally from the adjacent support arms 28 whereby the support arms 28 are adapted for movement selectively to the lower position at an elevation below the drill rod sections carried by the rack assemblies and to the upper position in alignment with the drive shaft 19. Since the rack assemblies move concomitantly in a transverse direction, the drill rod sections carried by the rack assembly remain in parallel relation to each other at all times.

As shown in FIG. 1, suitable micro switches 53 are carried by the frame 11 in position to be engaged by actuator elements 54 carried by the adjacent tubular member 27 to indicate relative angular positions of the support arms 28. Accordingly, the lower and uppermost positions of the support arms 28 are indicated by the micro switch assemblies 53. In like manner, micro switch assemblies 56 are carried by the supporting frame 11 in position to be engaged by actuator elements 57 carried by the elongated tubular member 27 to supply current for operation of the fluid pressure operated cylinders. Accordingly, the support arms 28 are always in proper position before actuation of the fluid pressure operated cylinders.

From the foregoing description, the operation of our improved apparatus will be readily understood. The drill rod sections 22 are positioned in the upwardly opening recesses 37 in the rack assembly 34 with the support arms 28 in the dotted line position shown in FIG. 2. When it is desired to transfer the first drill rod section 22 to a position in alignment with the drive shaft 19 the fluid pressure operated cylinders 32 are actuated to move the support arms 28 from the dotted line position to the solid line position shown in FIG. 2. With the drill rod section 22 in alignment with the drive shaft 19, the drive shaft is then connected to the adjacent end of the drill rod section 22 in the usual manner. The drilling apparatus is then operated whereby the transmission 18 drives the drive shaft 19 and drill rod section 22 as the carriage 13 is moved forward to bore a hole into the side of a mass of earth. After the first drill rod section 22 is driven into the mass of earth, the drive shaft 19 is disengaged from the first drill rod section and the carriage 13 is moved rearwardly to the position shown in FIG. 1. The support arms 28 are moved downwardly from the solid line position shown in FIG. 2 to the dotted line position and the rack assembly 34 is moved transversely toward the left, as viewed in FIG. 2 until the second depending recess 48 engages the movable element 51 of the micro switch 52 whereupon the second drill rod section 22 is in correct position to be engaged by the upwardly opening recess 29 in the support arm 28 upon upward movement of the support arms. Accordingly, the second drill rod section 22 is moved from the rack assembly to the upper position in alignment with the drive shaft 19. This procedure is repeated until all of the drill rod sections 22 are carried by the rack assembly 34 are employed or until the hole is of the desired depth in the mass of earth.

From the foregoing, it will be seen that we have devised an improved drilling apparatus for drilling holes into the side of a mass of earth. By providing a transverse rack which supplies the drill rod sections sequentially each time the support arms 28 are moved to their lowermost position, we not only facilitate the installation of the drill rod sections but also save a considerable amount of time and effort in supplying drill rod sections. Also, by providing means for accurately positioning the rack assembly in proper position for the support arms to pick up the drill rod sections sequentially, there is no delay in supplying the drill rod sections to the support arms whereby the apparatus operates in a substantially continuous manner. Furthermore, by providing power actuated means for moving the rack assemblies and the support arms our improved apparatus requires a minimum of labor to move the drill rod sections into alignment with the drive shaft.

While we have shown our invention in but one form it will be obvious to those skilled in the art that it is not so limited, but is susceptible of various other changes and modifications without departing from the spirit thereof.

What is claimed is:

1. Apparatus for drilling holes into the side of a mass of earth comprising:

a. a generally horizontal translatable frame, b. at least one carriage mounted for horizontal movement longitudinally of said frame, c. a power operated drive shaft carried by said carriage, d. a plurality of drill rod sections, e. means detachably connecting sequentially one end of each drill rod section to said drive shaft so that said drill rod sections are fed forward sequentially, f. spaced apart rack assemblies having upwardly opening spaced apart recesses therein for supporting said drill rod sections at an elevation below said drive shaft and in parallel relation thereto and adapted for movement transversely of said frame, g. transversely extending, spaced apart support arms mounted on said frame for pivotal movement in generally vertical planes about a common axis and having upwardly opening recesses therein for receiving a drill rod section and movable selectively to a lower position at an elevation below a drill rod section carried by said rack assemblies and an upper position in alignment with said drive shaft, h. means to move said rack assemblies concomitantly to position said drill rod sections sequentially in alignment with the path of movement of said support arms, and i. means to move said support arms from said lower position to said upper position after each drill rod section is moved into alignment with the path of movement of said support arms whereby said drill rod sections are removed sequentially from said rack assemblies and positioned in alignment with said drive shaft.

2. Apparatus for drilling holes into the side of a mass of earth as defined in claim 1 in which each of said rack assemblies comprises:

a. an elongated movable member having said upwardly opening recesses therein, b. guide members supporting said movable member for [ longitudinal ] movement *transversely of said frame* to selected positions, and c. power actuated means for moving said movable member to said selected positions.

3. Apparatus for drilling holes into the side of a mass of earth as defined in claim 1 in which said spaced apart support arms are carried by an elongated shaft-like member which in turn is operatively connected to at least one fluid pressure operated cylinder for moving said support arms selectively to said upper and lower positions.

4. Apparatus for drilling holes into the side of a mass of earth as defined in claim 2 in which at least one indicator member is operatively connected to said shaft-like member to indicate angular positions of said arms.

5. Apparatus for drilling holes into the side of a mass of earth as defined in claim 2 in which switch elements are operatively connected to said shaft-like member to supply current for operation of said fluid pressure operated cylinder.

6. Apparatus for drilling holes into the side of a mass of earth as defined in claim 1 in which indicator members are operatively connected to said rack assemblies to indicate when said rack assemblies are in position to support a drill rod section in alignment with movement with said support arms.

7. Apparatus for drilling holes into the side of a mass of earth as defined in claim 5 in which an actuating switch element is operatively connected to at least one of said rack assemblies and is operable each time said rack assemblies are moved forward in position to present another drill rod section in alignment with movement of said support arms.

*8. A drilling apparatus comprising: a generally horizontally extending drill guide frame; rotary drive means supported for reciprocating movement on said guide frame along the axis of rotation of said drive means; rack means carried by said guide frame for supporting a plurality of elongated drill steels with the longitudinal axes thereof being generally parallel to said axis of rotation and at least one such drill steel being below said axis of rotation; transfer means carried by said guide frame for removing said one such drill steel from said rack means and for subsequently transporting said one such drill steel upwardly into a position in alignment with said axis of rotation.*

*9. A drilling apparatus as specified in claim 8 wherein said rack means comprises a substantially horizontal member having upwardly opening spaced apart recesses therein for respectively supporting such drill steels against horizontal movement with respect to said rack means.*

*10. A drilling apparatus as specified in claim 8 wherein said rack means supports such drill steels in a manner that all the longitudinal axes of such drill steels are located below said axis of rotation.*

*11. A drilling apparatus as specified in claim 8 wherein said transfer means includes a drill steel support portion movable along a path from below said one such drill steel into contact with said one such drill steel and upwardly to a point wherein said one such drill steel is in alignment with said axis of rotation and wherein said support portion is movable along said path in a substantially continuous motion in one direction along said path.*

*12. A drilling apparatus as specified in claim 11 wherein said rack means is movable transversely with respect to said axis of rotation to move individual ones of such drill steels into said path prior to the respective transferring thereof by said transfer means.*

*13. A drilling apparatus as specified in claim 11 wherein said transfer means comprises at least one transfer arm pivoted at one end portion thereof to said guide frame and including said drill steel support portion at the opposite end thereof, and wherein said path is an arcuate path.*

*14. A drilling apparatus as specified in claim 13 wherein said transfer means comprises a plurality of transfer arms pivoted to said guide frame, each transfer arm having the same pivotal axis which extends in a direction generally parallel to said axis of rotation.*

*15. A drilling apparatus as specified in claim 14 wherein said drill steel support portion comprises a plurality of substantially upwardly opening recesses.*

* * * * *